G. URIARTE.
BREAKWATER OR THE LIKE.
APPLICATION FILED MAY 18, 1917.

1,353,001.

Patented Sept. 14, 1920.
3 SHEETS—SHEET 1.

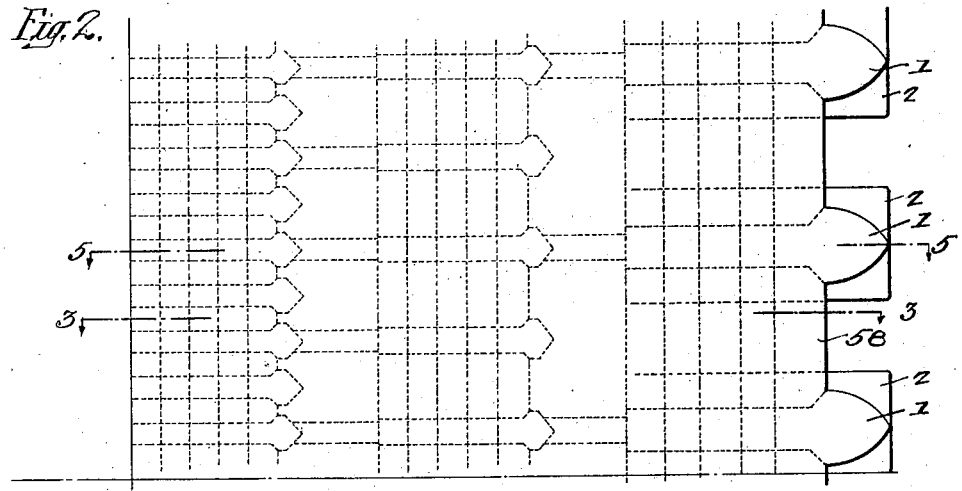
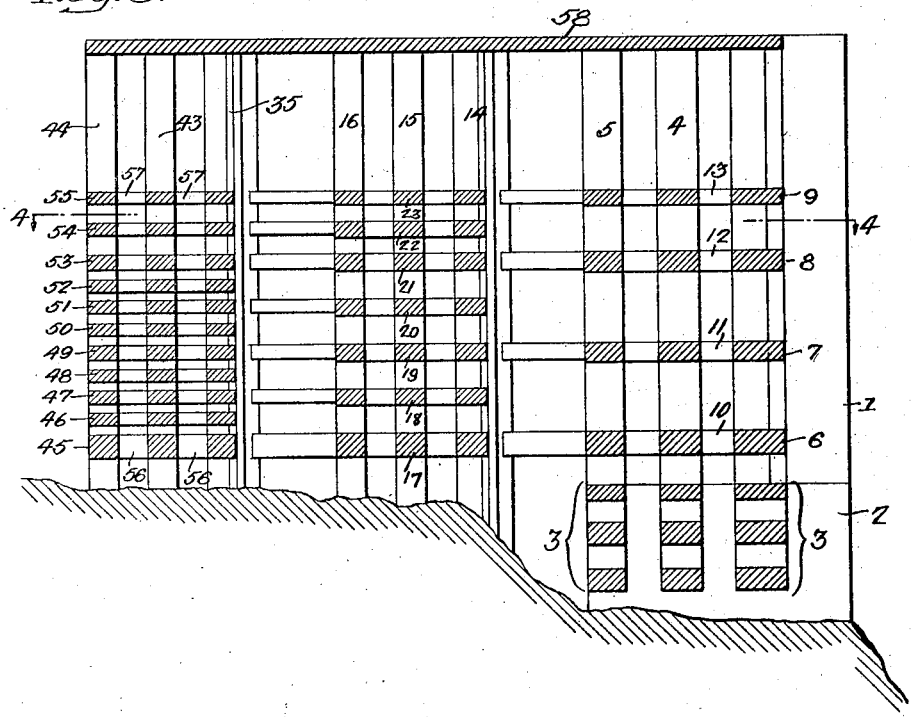

G. URIARTE.
BREAKWATER OR THE LIKE.
APPLICATION FILED MAY 18, 1917.

1,353,001.  Patented Sept. 14, 1920.
3 SHEETS—SHEET 3.

Inventor:
Gorgonio Uriarte,
by his Attorneys,

UNITED STATES PATENT OFFICE.

GORGONIO URIARTE, OF MADRID, SPAIN.

BREAKWATER OR THE LIKE.

1,353,001.　　　　Specification of Letters Patent.　　Patented Sept. 14, 1920.

Application filed May 18, 1917. Serial No. 169,595.

*To all whom it may concern:*

Be it known that I, GORGONIO URIARTE, a subject of the King of Spain, residing at Madrid, in the Kingdom of Spain, have invented Breakwaters or the like, of which the following is a specification.

One object of my invention is to provide a novel form of masonry or other suitable structure particularly adapted to serve as a harbor defense or breakwater, whose form and disposition of parts shall be such as to render it practically indestructible by the action of the waves and at the same time efficient in the highest degree in harmlessly dissipating the force of large, rapidly moving masses of water:—the invention especially contemplating a structure designed to present a succession of obstacles or barriers to each wave which will not only break it up but will retard its flow and dissipate its force.

I further desire to provide a break water, jetty, pier or like structure of such form and disposition of parts as will effectually prevent undermining or other destructive cutting action of the waves, while allowing the escape of air otherwise compressed in front of each wave, at the bottom of such structure; the arrangement being such as to sub-divide each wave and progressively retard the movement of the resulting separate masses of water.

Another object of my invention is to provide a novel combination of open work diaphragms associated in vertical and horizontal planes in such manner as to not only progressively sub-divide the waves, but so direct the resulting bodies of water as to cause them to react in such manner as will retard their movement and expend their force.

It is further desired to provide a diaphragmatic structure whose parts shall be so disposed as to cause each wave or moving body of water to be sub-divided and its movement opposed by other bodies of water in a quiescent state;—the diaphragms being arranged to break up the waves both in vertical as well as in horizontal planes.

These objects and other advantageous ends I attain as hereinafter set forth, reference being had to the accompanying drawings, in which, Figure 1 is a sectional perspective view illustrating the preferred form of my invention;

Fig. 2 is a plan of the structure shown in Fig. 1;

Fig. 3 is a transverse vertical section on the line 3—3, Fig. 2;

Figure 1:
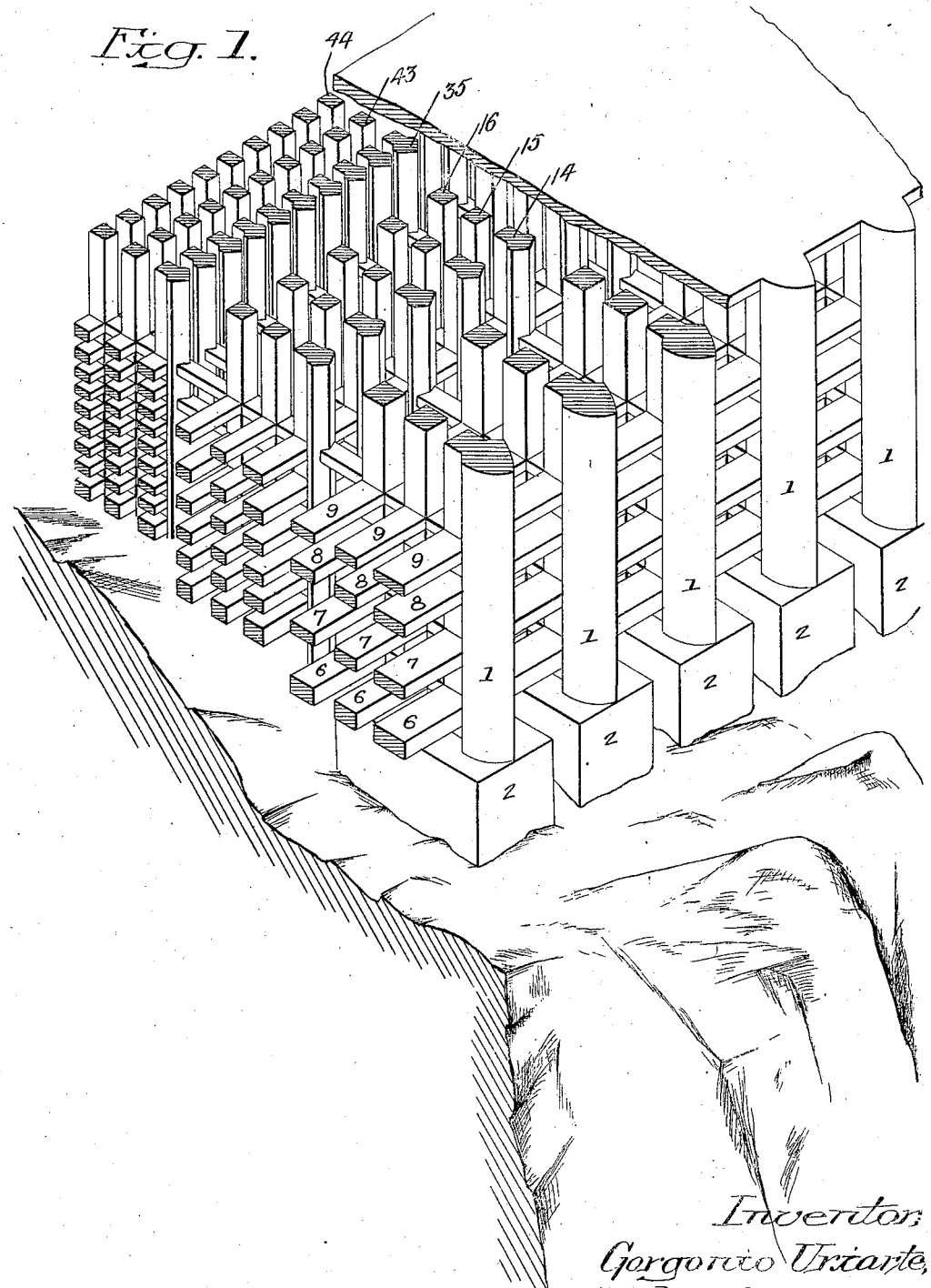
Figure 4:
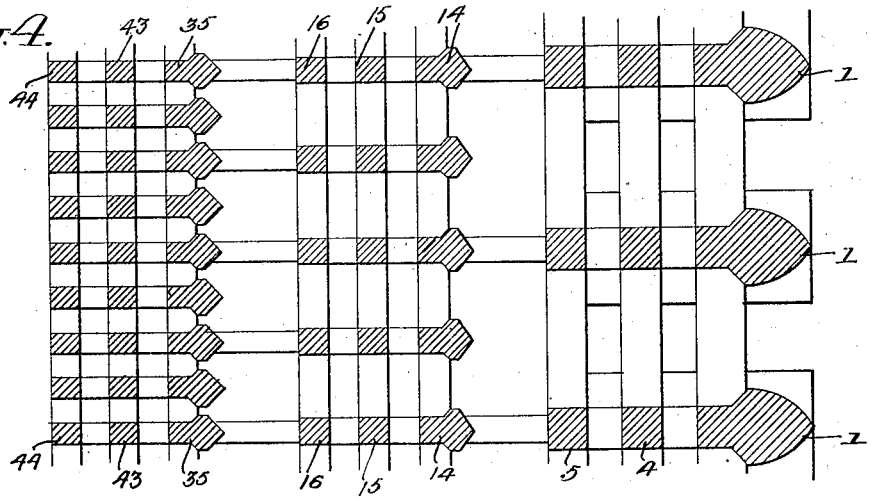
Fig. 4 is a horizontal section on the line 4—4, Fig. 3.
Figure 5:
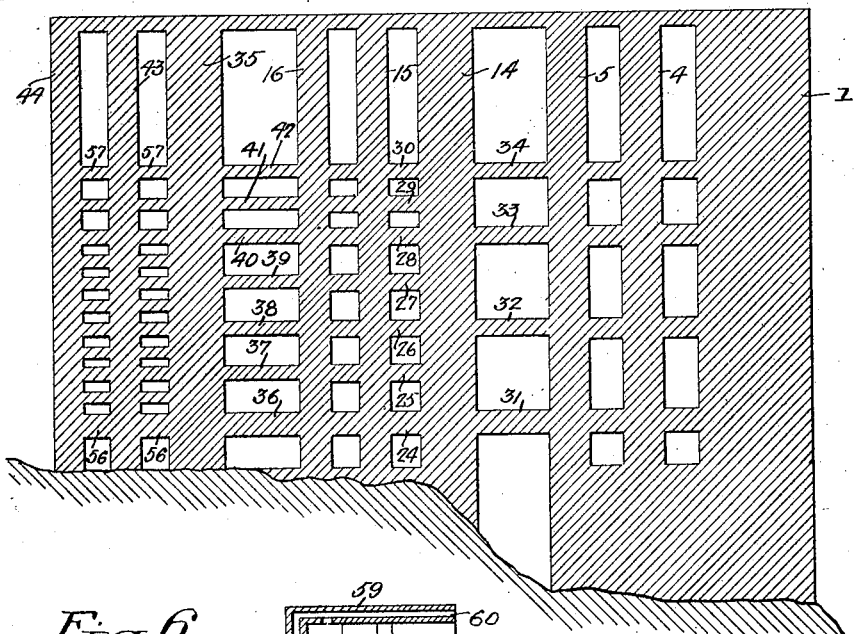
Fig. 5 is a vertical section on the line 5—5, Fig. 2.

As a result of extensive observation I have found that harbor defenses such as breakwaters, piers, jetties and the like are liable to injury and ultimate destruction by reason of undermining by a more or less explosive action of, the highly compressed air trapped or confined by each advancing wave or other body of water at the bottom or lower part of the structure adjacent its point of junction with its supporting bed of rock, etc. The expansion of such compressed air I have found to cut out the foundations of masonry structures as ordinarily made, so that sooner or later it is broken up and wrecked.

As a result of these observations and of practical experiments, I have found that if a wave or other moving body of liquid be divided and its various parts be directed one upon the other as well as upon suitable barriers in a definite manner, it is possible to gradually retard the movement and dissipate the force of such liquid without permitting it to do any damage. For this purpose I construct my breakwater as shown in the accompanying drawings wherein 1 represents a number of columns having sharp vertical front edges and dart or arrow shaped in horizontal section, so arranged as to constitute a series of definitely spaced cutwaters whose rear portions are wider apart than their head portions. These cutwaters are shown as built on and formed as part of solid masonry blocks or bases 2 which may be placed directly upon a rock bed or may be otherwise suitably supported in any of the ways familiar to those skilled in the art. In any case however, the lower ends of these cutwaters must extend one meter below mean low water level and to a height at least 6 meters above high water level. In order to properly brace the foundation blocks or footing courses I extend between each adjacent pair of them any suitable number of horizontal series of masonry struts 3 spaced apart by distances approximately equal to their thickness.

Immediately to the rear of each of the cutwaters 1 and spaced away from them in parallel vertical planes, are series of vertical columns 4—5 preferably of rectangular construction and of the same width as the adjacent rear portions of the cutwaters 1. Carried by these columns 1—4—5 are a series of horizontal perforated diaphragms made up, in the case illustrated, of sets of horizontal separated parallel panels 6—9 of which those of each set are arranged one above the other and are not only separated from each other vertically but are also spaced apart in their respective planes. In addition, each diaphragm includes struts 10—13 running from front to rear between the cutwaters 1 and the columns 4 and 5 immediately to the rear of it.

In a typical case, the cutwaters 1 were spaced 3 m. 60 between center lines while the horizontal distance between the forward edge of each cutwater and the rear edge of each column 5 was 4 m.

In the same case, 2 m. to the rear of the plane of the columns 5, I provide a second diaphragmatic structure whose horizontal thickness from front to rear is 3 m. and which is spaced away from a third diaphragmatic structure of 3 m. thickness by a distance of 2 m.

The second diaphragmatic structure is made up of a series of vertical columns 14 constituting cutwaters, immediately to the rear of each of which are two other vertical columns 15 and 16, with said second cutwaters constituting a supporting frame for a number of horizontal diaphragms made up of sets of horizontal panels 17—23. These latter are spaced more closely together vertically than are the panels of the diaphragms 6—9 and the columns of each set are braced from front to rear by panels 24—30. The cutwaters 14 are braced respectively to the columns 5 immediately in front of them by panels 31—34 respectively included in the diaphragms of the first series 6—9. Likewise the rearmost columns 16 of the second set of panels 36—42 are braced to the cutwater columns 35 immediately to the rear of them and belonging to the third diaphragmatic structure. These panels are included in the planes of the diaphragms 24—30 of the second diaphragmatic structure.

Immediately to the rear of each of the cutwaters 35 are two vertical columns 43 and 44 which with them, serve as the supporting frame for a third series of diaphragms 45—55, each of which includes other panels 56 and 57 extending between the columns 35, 43 and 44.

While in the breakwater illustrated, I have shown three diaphragmatic structures, obviously the number of these may be increased or diminished to suit any desired conditions, it being noted that the sharpened faces or heads of the cutwaters of the second set are more obtuse than those of the cutwaters 1 and that the number of diaphragms in each of the three structures progressively increases from front to rear of the breakwater. Further, while in a certain length of the first diaphragmatic structure, there are three cut waters 1 with their associated columns 4 and 5, in the second structure the number of cutwaters and columns is doubled and this number is again doubled in the third structure.

In the case illustrated, the distance between the diaphragms of the first or outer series is 1 m. 80 and the horizontal distance between the cutwaters is 3 m. 60. In the second structure the distance between the cutwaters is 1 m. 80 and 90 c. m. between the diaphragms. In the third structure the distance between the cutwaters is 90 c. m. and the vertical distance between the diaphragms 45 c. m. The topmost diaphragms of the three structures are all on the same level and the columns are extended above the same to a suitable height where they support a floor or roof 58.

With the above construction the body of an advancing wave, upon striking the cutwaters 1, is divided into a number of vertical sections, which are forced by the sharp edges of said cutwaters to narrow their widths, although after passing the heads of said cutwaters these masses are allowed to expand in spaces which while of greater horizontal width, are sub-divided vertically by the diaphragms of the first structure. As a result of this, the velocity of the water is decreased and as it continues to move to the rear, its horizontal flow is impeded by reason of its striking upon the front and side faces of the columns 4 and 5. Moreover, since the crest of the wave advances at a higher rate of speed than the lower portion thereof, the upper parts of the body of water pass downwardly through the openings in the diaphragm as they move toward the rear, constantly passing from narrower to wider and thence to narrower spaces, both vertically and horizontally and striking a succession of obstructions, with the result that the force of the wave is expended and the flow of its repeatedly sub-divided portions is constantly impeded, until finally it enters the comparatively wide space between the first and second diaphragmatic structures which is filled with water in a quiet state. This further retards the movement of the advancing bodies of liquid and if after mingling with this water the resultant mass still possesses sufficient energy to move rearwardly, it strikes the sharp edges of the second series of cutwaters 14, which separate it vertically into another series of masses or bodies and deflect the side portions of these toward each other as previously explained;—it being noted however, that the amount of sub-division is doubled both vertically by the cutwaters and horizontally by the increased number of diaphragms. After passing through the second diaphragmatic structure, the water enters a second enlarged space between it and the third diaphragmatic structure where after striking the dead body of water contained therein, it encounters the increased number of cutwaters and horizontal diaphragms of said latter structure which so subdivide and deflect it that by the time it reaches the rear of the third structure it is in a quiescent state without destructive possibilities.

Figure 6:
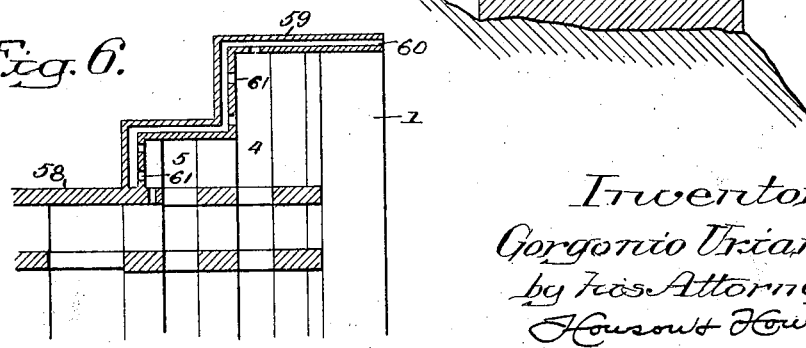
Fig. 6 is a fragmentary vertical section of a modification of the invention.

Obviously the imprisonment and compression of air in any quantity by a wave is impossible, since the many vertical channels provided through the various diaphragms permit of its free escape, as does also the space between the uppermost diaphragm and the floor 58. In order however, to guard against damage from exceptionally high waves, I may as shown in Fig. 6, vertically extend the front cutwaters 1 and one or both of the columns 4 and 5 to the rear thereof, for any suitable distance above the level of the floor 58, and while running a cover 59 over these, provide it with air channels 60 communicating through ports or openings 61 with the space under said cover. The air compressed by the upper part of a wave of unusual height would thus be permitted to escape through the channels 60 while the cutwaters 1 and the columns 4 and 5 associated therewith would be relied upon to so far break up and retard the movement of such upper wave parts as to render unnecessary the extension of any others of the columns above the level of the floor 58. In the case of Fig. 6 that portion of the floor 58 within or underneath the cover extension 59 would be perforated or provided with openings between the columns 1—4 and 5 to permit of the descent of any water entering above it.

From the above description it will be noted that I have so designed my breakwater as to place in the path of the successive waves a relatively large number of obstacles or sharp barriers whereby it is vertically and horizontally sub-divided and in addition I also provide cavities of enlarged section whereby the sub-divided liquid bodies will not only be allowed to expand but will meet quiescent bodies of water which will dampen or retard their movement.

I claim:

1. The combination in a break-water of a supporting frame; and a series of substantially horizontal perforated diaphragms carried thereby so as to present their edges to the waves.

2. The combination in a break-water of a supporting frame; a series of substantially horizontal perforated diaphragms carried thereby one above another so as to present their edges to the waves; with vertical cutwaters in front of said diaphragms.

3. The combination in a break-water of a supporting frame; and a plurality of series of substantially horizontal perforated diaphragms carried by said frame.

4. The combination in a break-water of a supporting frame; a plurality of series of substantially horizontal perforated diaphragms carried by said frame; and spaced cutwaters in front of at least one series of said diaphragms.

5. The combination in a break-water of a supporting frame; a plurality of series of substantially horizontal perforated diaphragms carried by said frame; with spaced cutwaters respectively in front of the diaphragms of each series.

6. The combination in a break-water of a plurality of spaced series of horizontal perforated diaphragms; and a series of spaced cutwaters in front of the diaphragms of each series.

7. The combination in a break-water of a plurality of series of columns of which the outermost of each series is formed with a sharp vertical edge; and a plurality of series of spaced panels supported at different levels by said columns to constitute a series of vertically spaced horizontal perforated diaphragms.

8. The combination in a breakwater of supporting frames; and a plurality of series of horizontal perforated diaphragms respectively carried by said frames, the number of diaphragms in each series increasing with the distance of said series from the front toward the rear of the breakwater.

9. The combination in a break-water of supporting frames; a plurality of series of horizontal perforated diaphragms respectively carried by said frames; with cutwaters in front of each series of diaphragms, the number of said cutwaters in a definite length of the break-water increasing from the front series toward the rear.

10. The combination in a break-water of supporting frames; a plurality of series of horizontal perforated diaphragms respectively carried by said frames; with cutwaters in front of each series of diaphragms, the number of said cutwaters in a definite length of the break-water increasing from the front series toward the rear and the number of diaphragms in each series also increasing from the front to the rear of the break-water.

11. The combination in a break-water of a plurality of series of columns arranged in parallel vertical planes, the outermost column on each series having a sharp vertical edge and an enlarged head; with a series of vertically spaced horizontal perforated diaphragms carried by said columns.

12. The combination in a break-water of a plurality of series of columns arranged in parallel vertical planes, the outermost column on each series having a sharp vertical edge and an enlarged head; with a series of superposed horizontal diaphragms carried by said columns, each of said diaphragms being composed of a series of panels spaced vertically from other diaphragms above or below it.

13. The combination in a break-water of a plurality of frames each including spaced vertical cutwaters and arranged one in front of the other with said cutwaters directed toward the waves, the number of cutwaters of each frame increasing with its distance from the front toward the rear of the break-water; and a series of superposed horizontal diaphragms carried by each of said frames and provided with openings for permitting the flow of water from one level to another.

14. The combination in a break-water of a supporting frame having cutwaters at its outer or forward face; a plurality of horizontal, spaced perforated diaphragms carried by said frame; and a floor or cover for the break-water.

15. The combination in a break-water of a supporting frame having cutwaters at its outer or forward face; a plurality of horizontal spaced perforated diaphragms carried by said frame; and a floor or cover for a break-water provided with passages for the escape of air from the interior of the break-water.

16. The combination in a break-water of a supporting frame having cutwaters at its outer or forward face; a plurality of horizontal spaced perforated diaphragms carried by said frame; and a floor or cover for a break-water having its outer or front portion at a higher level than the main part thereof.

17. The combination in a break-water of a supporting frame having cutwaters at its outer or forward face; a plurality of spaced perforated diaphragms carried by said frame; and a floor or cover for the break-water having its outer or front portion at a higher level than the main part thereof and provided with air passages in said front portion to permit of the escape of air from the interior of the break-water.

18. The combination in a break-water of a series of perforated diaphragms arranged one above the other; with means adjacent the forward or outer edges of said diaphragms for vertically sub-dividing successive waves and thereafter causing the sub-divisions to undergo successive compression and expansion.

GORGONIO URIARTE.